E. H. BALLOU.
WEFT REPLENISHING LOOM.
APPLICATION FILED AUG. 30, 1915.

1,244,827.

Patented Oct. 30, 1917.
5 SHEETS—SHEET 1.

Witness
Ivan A. Blake

Inventor
Eugene H. Ballou
by Chas. F. Randall
Attorney

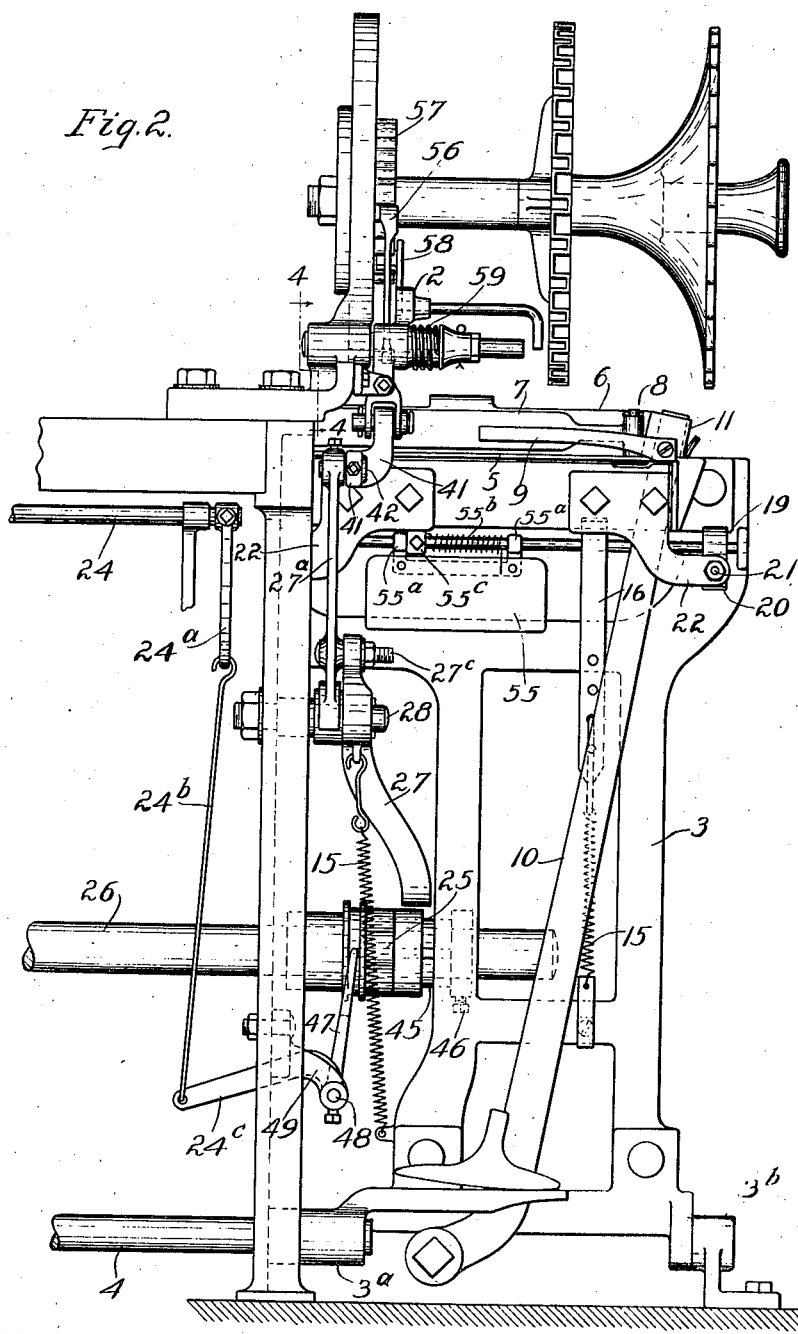

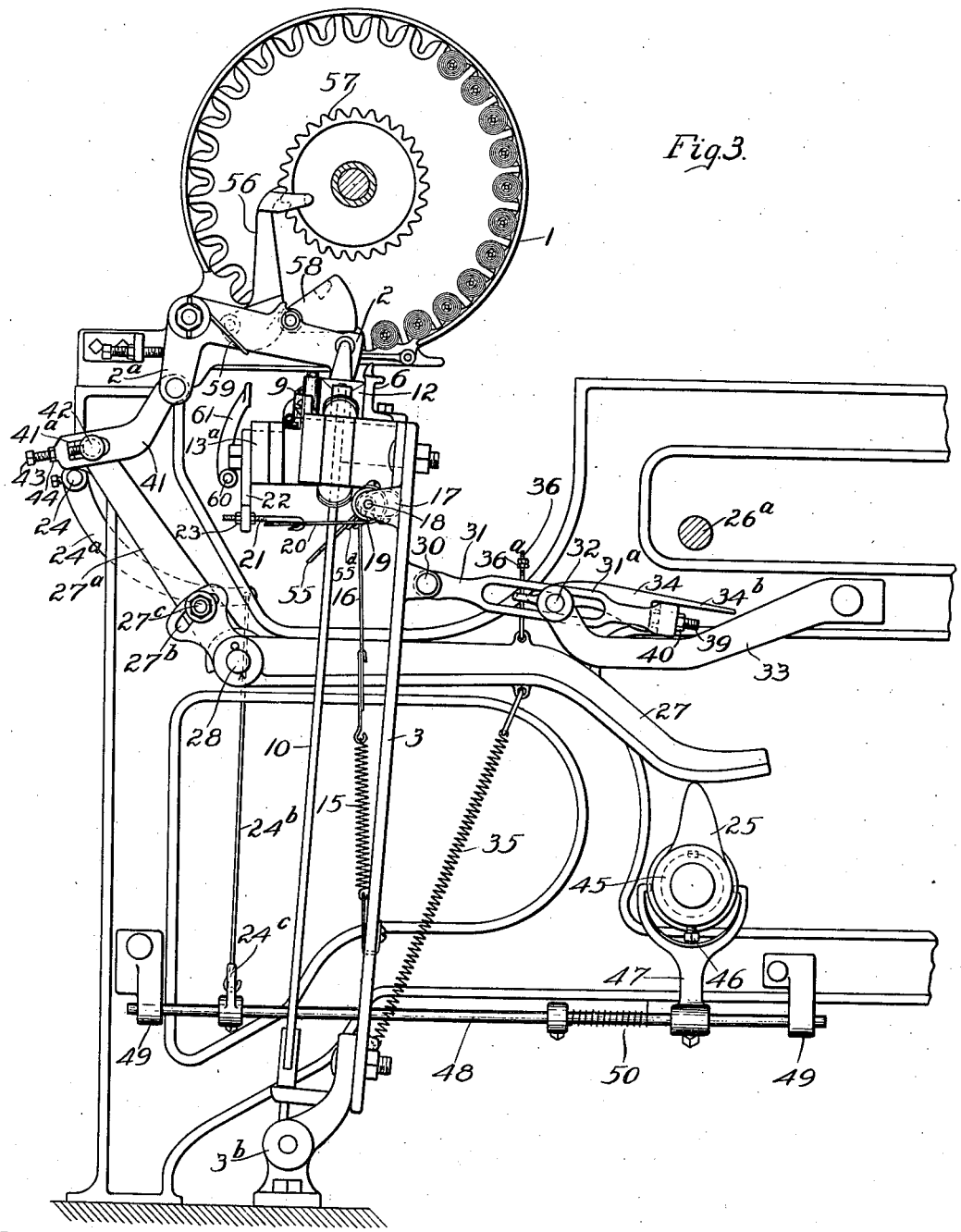

E. H. BALLOU.
WEFT REPLENISHING LOOM.
APPLICATION FILED AUG. 30, 1915.

1,244,827.

Patented Oct. 30, 1917.
5 SHEETS—SHEET 4.

Witness
Ivan A. Blake

Inventor
Eugene H. Ballou
by Chas. F. Randall
Attorney

E. H. BALLOU.
WEFT REPLENISHING LOOM.
APPLICATION FILED AUG. 30, 1915.

1,244,827.

Patented Oct. 30, 1917.
5 SHEETS—SHEET 5.

Witness
Ivan A. Blake.

Inventor
Eugene H. Ballou
by Chas. F. Randall
Attorney

UNITED STATES PATENT OFFICE.

EUGENE H. BALLOU, OF PAWTUCKET, RHODE ISLAND, ASSIGNOR, BY DIRECT AND MESNE ASSIGNMENTS, TO DRAPER CORPORATION, OF HOPEDALE, MASSACHUSETTS, A CORPORATION OF MAINE.

WEFT-REPLENISHING LOOM.

1,244,827.   Specification of Letters Patent.   Patented Oct. 30, 1917.

Application filed August 30, 1915. Serial No. 47,910.

*To all whom it may concern:*

Be it known that I, EUGENE H. BALLOU, a citizen of the United States, residing at Pawtucket, in the county of Providence, State of Rhode Island, have invented a certain new and useful Improvement in Weft-Replenishing Looms, of which the following is a specification, reference being had therein to the accompanying drawings.

The invention is an improvement in automatic weft-replenishing looms of the class in which replenishment is effected without stoppage of the loom. It has for its general objects to produce a loom of the said class which in its working shall allow more time for the performance of the replenishing operations than is allowed in looms at present in use, and one which shall be practically free from the liabilities to faulty working, and to accidents and breakage, that exist in the case of such looms.

The transferring operation is performed with extreme suddenness in looms such as are at present in use. Even when the loom is running at an ordinary speed, as for instance when the lay is beating-up about one hundred and sixty times per minute, the transferring operation performed at the end of a stroke forward (when the lay is at front center) is caused to take place in a very small fraction of a second. Such operation, involving the insertion of a reserve weft-carrier into the shuttle and the ejection of the spent or failed weft-carrier from the shuttle, being performed with great suddenness and almost instantaneous rapidity, necessarily entails considerable strain and shock. Also, as a result of the extreme suddenness with which the reserve weft-carrier is moved by the transferrer down to the shuttle, little opportunity is afforded for the weft-carrier and shuttle to adjust themselves longitudinally with relation to each other in case of longitudinal displacement of either. Hence failures to insert the reserve weft-carrier into the shuttle occur frequently, with accompanying faulty working, accidents, and breakage. The liabilities to these latter are increased largely by the action by which a loaded or filled reserve weft-carrier is transferred from a magazine or feeder on the loom-frame to a shuttle on the lay being timed to take place just as the lay in moving toward the fell arrives at the forward limit of its stroke (front center). To enable the transfer to be performed successfully with such timing, it first of all is necessary that the lay at front center should present the shuttle in such position with relation to the fixed end-stop which guides the reserve weft-carrier in its descent from the magazine or hopper that the openings of the shuttle and of the carrier-engaging spring clip within the shuttle will be in exactly the right place to receive the weft-carrier and its head as it is driven down by the transferrer. If for any reason the said openings should be too far forward in the loom, or too far rearward, at the time the transfer takes place, the head of the descending weft-carrier would strike upon one side-arm or the other of the clip, or upon one side-wall or the other of the shuttle, and thereby the entrance of the weft-carrier into the shuttle would be obstructed, with more or less injury to one or both of them or one or more of the parts concerned in effecting the transfer. This ocurs frequently in practice, partly owing to faulty adjustments of the parts, but largely in consequence of the fact that the position reached by the lay at front center varies as a result of differences in overthrow due to differences in the speed at which the loom is driven, and also as a result of wear of the bearings of the crank-shaft, and of the cranks and the connections between the latter and the lay.

Briefly stated, the invention consists, chiefly, in a replenishing loom in which when replenishment is to take place a pause or dwell is occasioned in the movements of the working shuttle toward and from front center, and replenishment of weft or filling is effected during such pause or dwell, preferably without interruption of the regular weaving operations. The pause or dwell affords more time for the performance of the transferring operations, and gives opportunity for a comparatively easy and deliberate action of the working parts in effecting transfer. It obviates the drawbacks and evils of requiring the various actions that are incident to replenishing to take place precipitately and instantaneously in the exceeding brief time-interval corresponding with the arrival of the lay at front center and preceding its start rearward. In other words, the pause or dwell makes it possible to effect replenishment without the suddenness, strain, and shock heretofore usual, and without the usual liability to accidents and breakage.

In its broad phases, the invention is not limited with respect to specific construction, inasmuch as it admits of being carried into effect in different ways. Preferably the pause or dwell is caused to take place rearward of the position which regularly is reached by the forwardly advancing shuttle as the lay arrives at front center. This may be accomplished by holding back the lay or a part thereof, as for instance the shuttle-box at the replenishing side of the loom, during the time ordinarily occupied by advance of the lay to front center, or the latter portion of such advance, and the return movement to the point at which the advancing movement was suspended, and thereafter continuing the full movements in usual manner. By causing the pause or dwell to occur at rear of front center the disturbing effects of variable overthrow of the lay are eliminated.

The drawings show an illustrative embodiment of the invention in which the construction provides for movement of the shuttle-box at the replenishing side of the loom forward and rearward in unison with the other parts of the lay, and in regular working relations therewith so long as weft-replenishment is not required; and in addition provides for causing the said shuttle-box to dwell at the rear of front center when weft-replenishment is required, while such other parts of the lay continue their advance toward front center and until their return into proper line with it, the replenishment being effected meanwhile; and for causing the said shuttle-box to resume its movements in company with the other parts of the lay and in the usual working relations therewith, after the replenishment has been effected, until the next replenishment is indicated to take place. This embodiment includes various special features of improvement constituting specific features of the general invention.

In the drawings,—

Fig. 2 is a view in front elevation of the parts at the same end of the loom.

Fig. 3 is a view corresponding with Fig. 1 in respect of the parts that are shown, but showing them in the positions occupied when the transferring action occurs.

Figure 1:
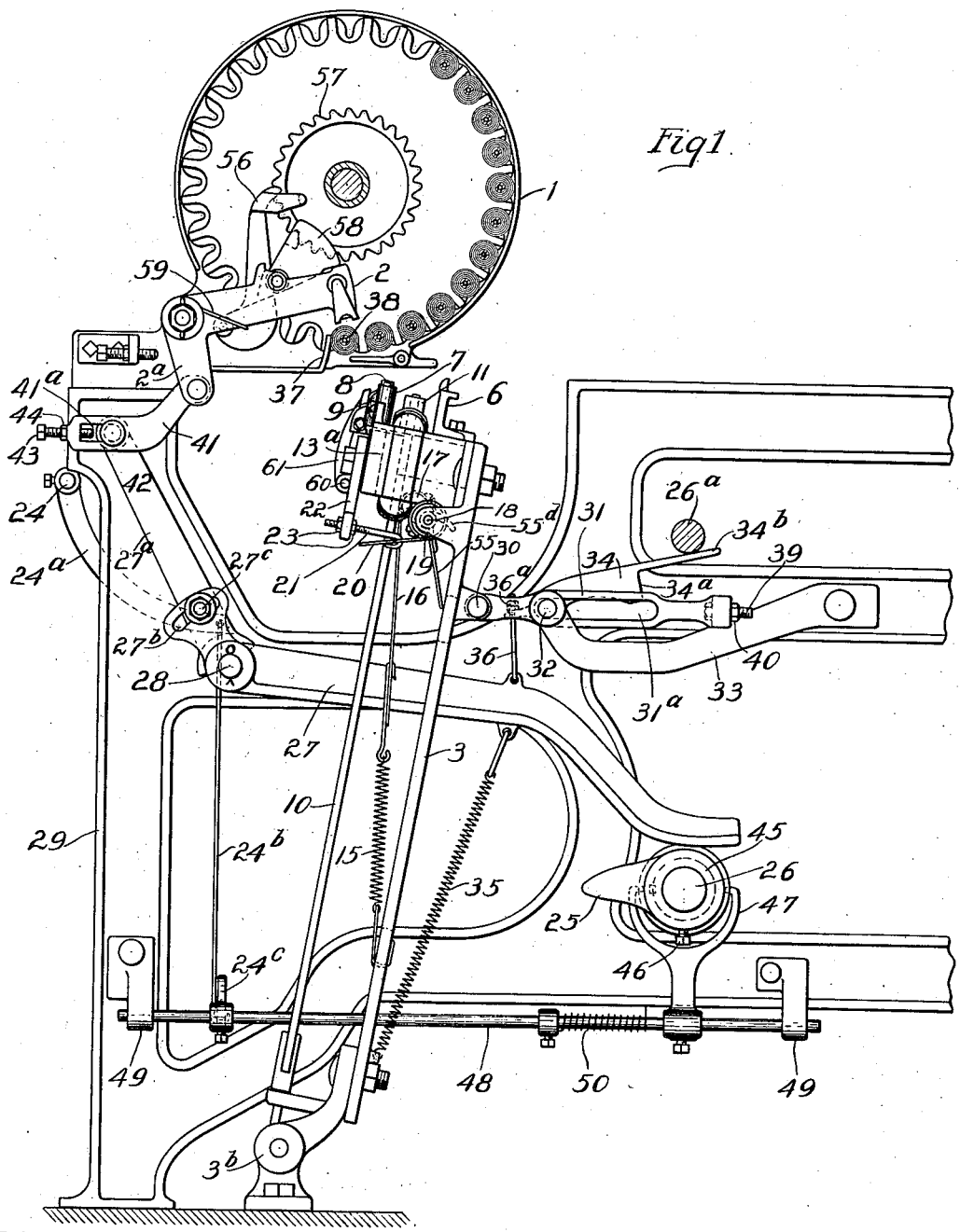
Figure 1 is an elevation of certain portions of a bobbin-changing weft-replenishing loom containing the embodiment aforesaid of the invention, the lay and crank-shaft being in vertical section, and only such parts of the loom being shown as are useful in explaining the invention. In this view the parts are in normal condition.
Figure 5:
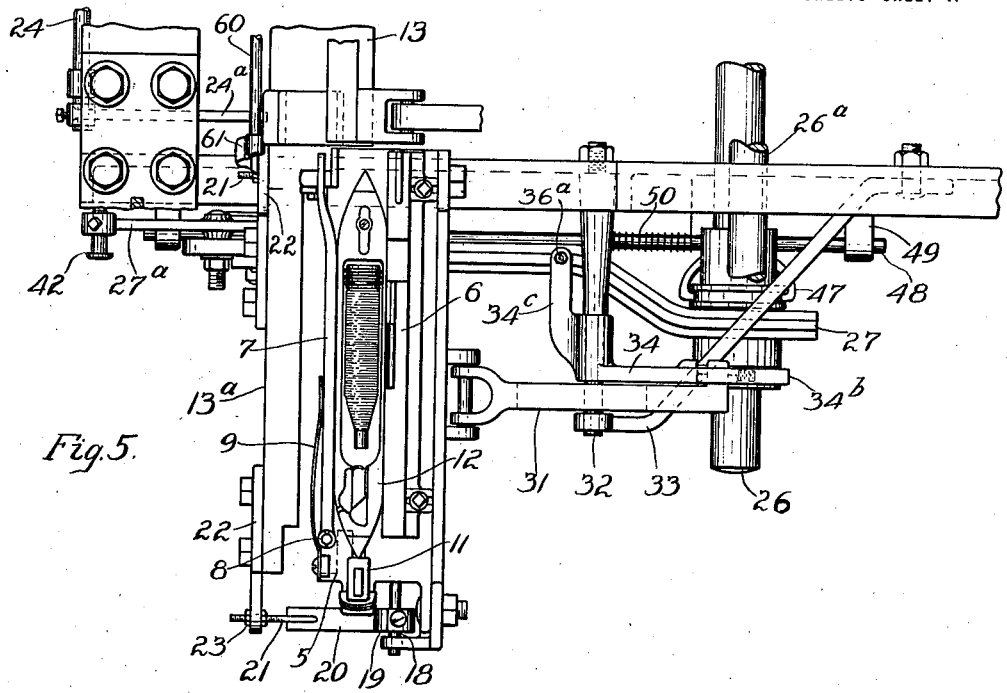
Figure 4:
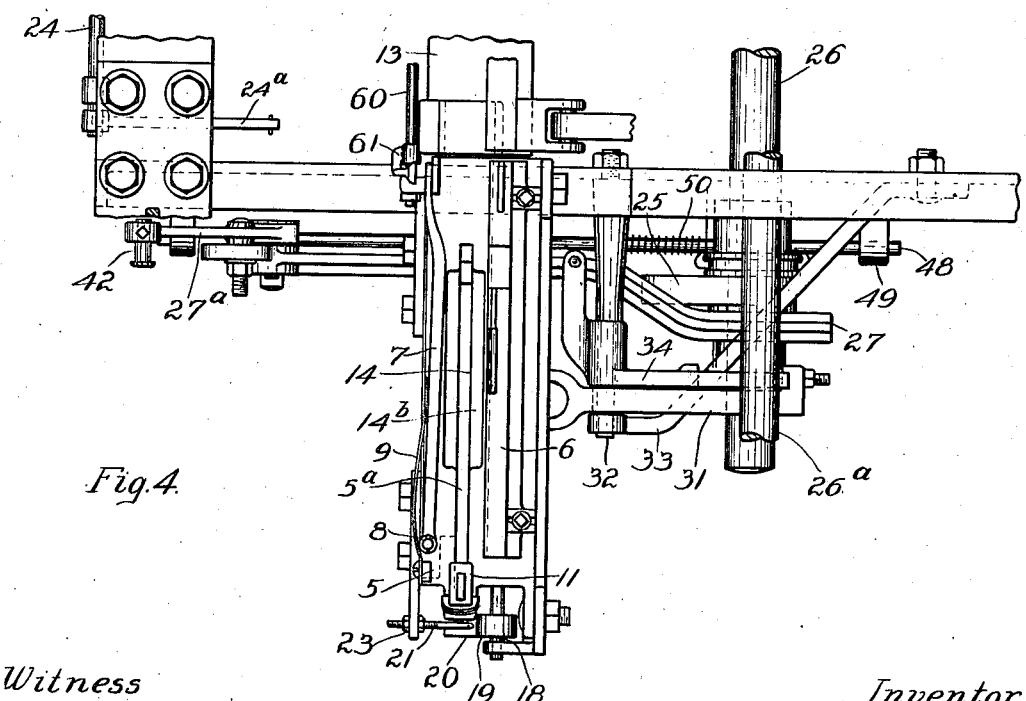

Figs. 4 and 5 are plan views with the magazine or feeder and transferrer removed, respectively illustrating the conditions during normal working as in Fig. 1 and at time of replenishment as in Fig. 3. In Fig. 4 the lay is rearward, at or near back center. In Fig. 5 it is at or near front center.

Figure 6:
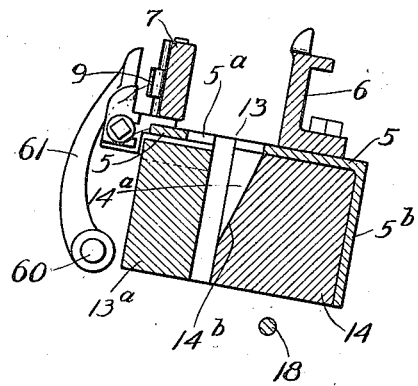
Figure 7:
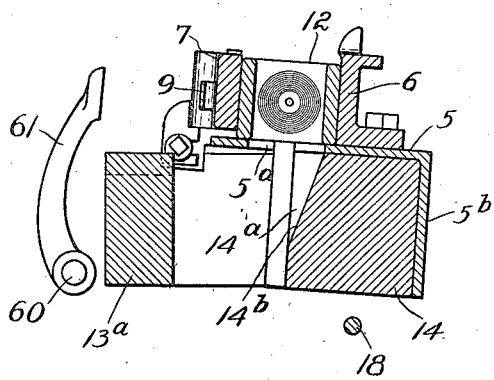
Figure 11:
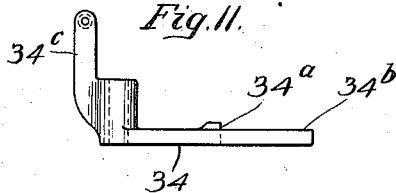
Figure 10:
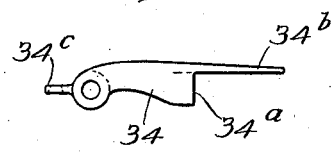
Figure 9:
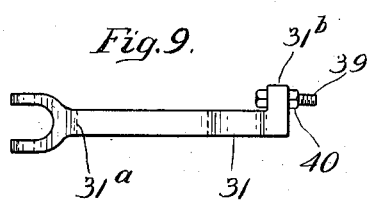
Figure 8:
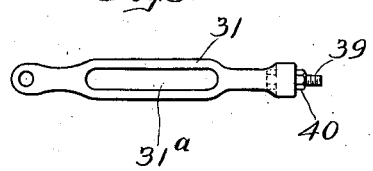

Figs. 6 and 7 are views in vertical section of the lay and the shuttle-box at the replenishing end of the loom, showing the parts in different conditions as in Figs. 1 and 3, and Figs. 4 and 5.

Figs. 8 to 11, inclusive, are views of details.

Referring to the drawings,—

In the said illustrative embodiment, the shuttle-box at the side of the loom at which the magazine or feeder 1 and transferrer 2 are located is carried by a frame which normally moves back and forth in unison with the lay, with the opening of the said shuttle-box in the line of the path of the shuttle upon the lay, as shown best in Fig. 4, but the said frame is capable of a change of position relative to the lay, in the direction from front to rear. During the regular working of the loom the said shuttle-box serves exactly like an ordinary shuttle-box and the shuttle passes into and out of the same in the ordinary manner in being picked back and forth across the loom. The construction of the shuttle-box and its frame, the manner of mounting or supporting the same, and the manner of combining it with the lay, may vary in practice. In this instance, the shuttle-box frame 3 is supported separately from the lay proper, although this separate support is not material so far as the main features of the invention are concerned. The said frame is shown as provided at the inner end of its foot-portion with a bearing 3$^a$ which fits upon the outer end-portion of lay rockshaft 4, and as in pivotal engagement at the outer end of said foot-portion with a small stand 3$^b$ located in line with the lay rockshaft. Mounted in this manner, the said shuttle-box frame swings around a prolongation of the axis around which the lay swings. As a convenient form of construction, the top-portion of the swing-frame 3 supports a metal piece having a forwardly-extending plate 5, shown best in Figs. 6 and 7, constituting the bottom of the shuttle-box. Upon the top of the said plate is bolted a shuttle-box back 6, and a shuttle-binder 7 is pivoted at 8 upon the plate, the said binder having a pressure-spring 9 as usual. Plate 5 has therein a slot 5$^a$ which accommodates the picker-stick 10 carrying the picker 11, and the movements of the picker-stick in picking the shuttle 12, the inner portion of the slot being widened as shown in Figs. 4, 6, and 7, to an extent suitable to provide for the passage downward through it of a weft-carrier ejected from the shuttle.

The top surface of the plate is in line with that of the lay-beam 13, and forms a continuation of the shuttle-race of the lay. The metal piece aforesaid is formed at its back with a downwardly extending web or flange 5$^b$, Figs. 6 and 7. Within the angle formed by the plate and its web or flange a small beam-section 14 is fixed. The said beam-section is of the same length, substantially, as the shuttle-box, and has its front surface located close to the line of movement of the picker-stick in order that it may serve as a rear guide for the picker-stick in the movements of the latter. Below the widened portion of the slot 5$^a$ in plate 5 the front of the beam-section 14 is recessed at 14$^a$ to provide for continued descent of the ejected weft-carrier after passing through the said widened portion, the back 14$^b$ of the recess being inclined or slanted forward to deflect the said weft-carrier forward. An extension 13$^a$ of the lay-beam 13 projects outward in front of the beam-section 14, the rear surface of the said extension being adapted to serve as a front guide for the picker-stick.

During the regular working of the loom the shuttle-box is kept in its normal alinement with the path of the shuttle on the lay by suitable means for the purpose. The means and manner of determining the alinement, and of maintaining it under the usual working conditions, may vary more or less in actual practice. Usually the alinement will be determined by suitable stops in connection with the swing-frame and the rest of the lay, which abut against each other when the shuttle-box is in the proper position with relation to the said path. In the present instance, the means of keeping the shuttle-box normally in working alinement and of restoring it thereto after departure therefrom, consists of tension devices that include a contracting spiral spring 15. One end of the said spring is connected to the lower part of the swing-frame 3. The other end thereof is hooked to the lower portion of a strap 16, such strap having its upper portion passed part way around and made fast at its extremity to a rounded radial projection 17 on a transversely extending horizontal rockshaft 18 that is mounted in bearings in the upper portion of the swing-frame 3. The tension of spring 15 may be adjusted by hooking it into holes at different points in the length of strap 16, as will appear in Fig. 2. The pull of the spring 15 as exerted upon projection 17 tends to rotate or rock the rockshaft forwardly in the said bearings. This tendency is made effective in holding the shuttle-box in working relations with the path of the shuttle across the lay by means of sheaves 19 that are made fast upon the rockshaft adjacent the opposite ends thereof, each sheave having wound part way around and made fast to it the rear portion of a strap 20. The front ends of the two straps 20 are engaged with hooks 21, 21, carried by brackets 22, 22, attached to the extension 13$^a$ of the lay-beam. Hooks 21, 21, are adjustable lengthwise to take up as much as may be desired the length of the straps 20 and provide for the desired angular adjustment of projection 17, and are furnished with locknuts 23, 23. The tendency of the rockshaft 18 to rock or turn forwardly under the pull of spring 15 tends to wind up the pulleys 19 within the straps 20. This tendency of the pulleys 19 to wind up within the straps operates with the effect of drawing the frame 3 forward and keeping the positioning stops in engagement with each other. Thereby the alinement of the shuttle-box with the path of the shuttle upon the lay is maintained until relative displacement is brought about by reason of the shuttle-box being caused to dwell or pause while the lay continues its movement toward and from front center, $i. e.$, toward and from the fell.

The pause or dwell in the movement toward and from front center of the shuttle-box and the shuttle contained therein is brought about in this embodiment by detaining the frame 3 in a rearward position. The invention is not necessarily restricted with respect to the exact means and manner of producing such pause or dwell, or with respect to the exact point in the forward and rearward movement at which the detention takes place. The detention is indicated for by means of the devices serving to call the replenishment, or change, of weft at the required times in the working of the loom. The devices for indicating or calling the replenishment, which might be simple change of weft, may be pattern or counting devices, but usually will be weft-indicating devices serving to indicate a predetermined condition of the working supply of weft or filling. The breast-beam rockshaft 24, in practice, usually is utilized in carrying the invention into effect, and is combined operatively with the indicating devices, of whatever nature employed, so as to be rocked when it is required to call the change. I usually employ a rotating cam 25 in secondary control of the shuttle-box and replenishing or change instrumentalities, and itself controlled as to the actuation of the shuttle-box and the said instrumentalities, by means of the indicating devices, aforesaid, through the intermediary of the said breast-beam rockshaft. Normally, this cam is inoperative so far as the shuttle-box and the replenishing instrumentalities are concerned, but it is adapted to be called into action to bring about the pause or dwell of the shuttle-box and thereby of the shuttle, and the performance of the replenishing or change operations. In the drawings, the actuation of the said rotating cam is shown provided for by the cam being mounted upon the cam-shaft 26 of the loom, and the bringing about of the said results is provided for by the cam being arranged for coöperation at the required time with a lever 27 mounted by means of a pivot 28 upon the loom-frame 29 at the replenishing side of the loom. This lever serves as a means of enabling the rotating cam to bring about the said pause or dwell of the shuttle-box and shuttle and the actuation of the transferrer, as well as the turning movement of the rotary portion of the magazine or feeder. For service in occasioning the said pause or dwell, the swing-frame 3 has connected pivotally to it at 30 an arm 31, shown separately in Figs. 8 and 9, Sheet 4, which extends rearwardly and is slotted lengthwise at 31$^a$ to fit over a fixed or stationary guide-pin or stud 32 projecting outward from the loom-frame and stayed at its outer end by means of a bracket 33 which also is attached to the loom-frame. In the regular working of the loom the said slotted arm simply slides idly forward and rearward upon the said pin or stud, and the frame 3 accompanies the lay as the latter swings forward and rearward. For coöperation with the arm 31 in occasioning the pause or dwell, a dog or detent 34, shown separately in Figs. 10 and 11, Sheet 4, is hung upon the fixed or stationary pin or stud 32, with its acting portion extending rearward therefrom, such acting portion being provided with a shoulder 34$^a$ adapted to engage with the arm 31 for the purpose of detaining frame 3 from movement forward. Normally the dog or detent is held in the inoperative position shown in Fig. 1, with its shoulder 34$^a$ elevated relative to the portion of arm 31 with which it engages, and with its stop-finger 34$^b$ in contact with the under side of the crank-shaft 26$^a$, by means of the weight of the actuating lever 27, aided by the tension of a contracting spiral spring 35 engaged with the said lever, the lever acting through connections comprising a forwardly projecting finger 34$^c$ of the dog or detent, a link 36 which is engaged pivotally by its lower end with the lever and at its upper end passes loosely through a hole in the said finger, and collars or nuts 36$^a$ on the upper end of the said link which make contact with the top of the finger. When the lever is raised by the action of the cam 25 the upward movement of the link and its collars or nuts permits the dog or detent to move so that when the lay is at or near back center the engaging shoulder of the said dog or detent will pass down in front of the engaging portion of the arm 31. As the lay moves forward with the shuttle in the shuttle-box connected with frame 3, the dog or detent will engage with the said engaging portion of arm 31, and thereby detain the swing-frame and shuttle-box and the shuttle contained in the shuttle-box in a position in which the top of the opening of the shuttle-box will be presented in such relation to the end-stop or weft-carrier guide 37 in connection with the magazine or feeder that the reserve weft-carrier 38 which is at the acting surface of the said end-stop shall enter properly into the openings of the shuttle and its spring-clip. To provide for convenient adjustment of the position of the shuttle-box and shuttle with relation to the end-stop, so as to insure that the reserve weft-carrier which is next to be transferred to the shuttle shall enter the latter properly and without obstruction, I provide the slotted arm 31 with an anjustable abutment which in this instance is constituted by a bolt 39 having a screw-threaded stem that is entered into a threaded hole tapped in a laterally projecting lug 31$^b$, Fig. 9, on the rear end of the slotted bar, the said threaded stem being provided with a lock-nut 40 to prevent accidental loss of adjustment. The detention of the shuttle-box and shuttle takes place after the shuttle in its flight across the loom from the opposite side of the latter has entered fully into the shuttle-box. The actual point may vary more or less between back center and front center, according to the desired duration of the pause or dwell. The magazine or feeder, and end-stop 37, or weft-carrier guide, occupy positions farther rearward than heretofore relative to the position reached by the lay at front center, and the transferrer is disposed accordingly. The means of actuating the transferrer 2 may vary in practice. In some cases the means for such purpose which has been employed heretofore in practice may be used. In the drawings, the transferrer is combined operatively with the actuating lever 27 by means of a link 41 which is connected pivotally at the rear end thereof to the downwardly extending arm 2$^a$ of the transferrer, the front end of the link being slotted at 41$^a$ to fit over the stem of a headed stud 42 projecting laterally outward from an arm of the said lever. Inasmuch as the same swinging movement of the lever that drops the engaging portion or shoulder of the dog or detent into a position to engage with the slotted arm so as to hold back the shuttle-box and shuttle is utilized also to actuate the transferrer to transfer a reserve weft-carrier from the hopper or magazine to the shuttle, I provide for the necessary lead in the movement of the dog or detent into engaging position, by means of the slot 41$^a$ in the link intermediate the lever and transferrer. This slot permits the lever to move to the extent necessary to drop the dog or detent into engaging position, before the stud 42 encounters the front end of the slot so as to effect the actuation of the transferrer. I provide for adjustment in the timing of the transferrer by means of an adjusting screw 43 which is set in a threaded hole tapped in the front end-wall of the slot of the link, with its inner end projecting into the slot and adapted to be engaged by the stem of the stud. A lock-nut 44 serves to prevent accidental loss of adjustment of the said adjusting screw. Variation in the angular relationship of the forward arm 27ª of lever 27 with respect to the rear portion of the lever may be provided for by making such arm as a separate piece with a concaved inner end to fit upon the hub of the lever, and with a curved slot 27ᵇ receiving a clamping bolt 27ᶜ which adjustably fixes the arm to the main part of the lever.

Normally the rotating cam 25 is inoperative with respect to the actuating lever 27. This inoperativeness, and the rendering of the cam operative, may be provided for variously. In the present instance the cam is combined with the cam-shaft 26 of the loom in a manner providing for shogging movement of the cam lengthwise of the cam-shaft. To this end the cam-hub is fitted upon the exterior of a sleeve 45 which is fixed by means of a clamping-screw 46 upon the proper portion of the cam-shaft, and the cam-hub is splined to the said sleeve. A grooved collar in connection with the cam-hub receives between its flanges the arms of a shifter-fork 47 made fast upon a rockshaft 48 mounted in a position parallel with the side-frame of the loom, in bearings that are provided in stands or brackets 49, 49, attached to the said side-frame. A spring 50 combined with this rockshaft acts with a tendency to turn or rock the same so as by means of the said shifter-fork to hold the cam so positioned relative to the actuating lever that the acting portion of the cam shall miss or clear the lever in rotating. Connections between the breast-beam rockshaft 24 and the shifter rockshaft 48 provide for rocking the rockshaft 48 when the breast-beam rockshaft 24 is rocked, so as through the shifter-fork 47 to shog the cam lengthwise of the cam-shaft and place the acting portion of the cam in position to act upon the actuating lever as the cam-shaft and cam rotate. The said connections comprise the arm 24ª fixed on breast-beam rockshaft 24, link or connecting-rod 24ᵇ having its upper end engaged with such arm, and arm 24ᶜ fixed on rockshaft 48 and having the lower end of link or rod 24ᵇ engaged therewith.

In operation, the shogging of the cam into position to engage and operate the actuating lever is followed by movement being imparted to the said lever by the acting portion of the cam. The movement of the lever first operates to place the dog or detent 34 in position to detain the shuttle-box and shuttle in proper position relative to the end-stop, magazine or feeder, and transferrer, so as to provide for the safe transfer of the leading weft-carrier in the magazine or feeder from the latter to the shuttle, and then the transferrer is actuated to effect the transfer. Meanwhile the lay continues its forward stroke to front center and returns rearward. As it moves rearward the lay carries the shuttle-box frame rearward with it, and thereafter the tension devices hold the shuttle-box in proper register with the path of the shuttle on the lay while the shuttle is picked to the opposite side of the loom and while the regular operations of the loom proceed, until the change or replenishing operations are required to be repeated. The cam 25 having acted, it is shogged back into its normal position as the controlling and shogging devices therefor resume their own normal positions. A chute or deflector 55 for the ejected weft-carrier is hung by means of ears 55ª upon rockshaft 18, as shown best in Fig. 2. During the normal working of the loom the said chute or deflector is kept in a position at the rear of the path in which the picker-stick 10 moves, as in Fig. 1, by means of a spiral spring 55ᵇ, Fig. 2, surrounding the rockshaft and engaging by one end with a collar 55ᶜ, made fast upon the rockshaft, and by the other with the chute. The rocking of rockshaft 18 which results when the dog or detent engages with arm 31 and holds frame 3 rearward carries forward a finger 55ᵈ, Fig. 1, that is fixed upon the rockshaft so that such finger engages with the chute or deflector and swings the latter forward as in Fig. 3 into position to receive and deflect forward the ejected weft-carrier. As the lay moves rearward from front center the reverse rocking of rockshaft 18 under the action of spring 15 allows spring 55ᵇ to return the chute or deflector rearward to its position in Fig. 1.

The magazine or feeder and transferrer and various appurtenant parts are of well-known character so far as shown in the drawings. An ordinary detent or holding pawl or dog 56 pivoted to the stationary stand of the magazine or feeder is shown as engaging with a ratchet-wheel 57 to prevent accidental reverse movement of the magazine or feeder. An actuating pawl 58 of well-known character is shown as carried pivotally by the transferrer, to actuate the magazine or feeder through its engagement with the said ratchet-wheel in the return-movement of the transferrer following a transfer. 59, Fig. 2, is the usual spring tending to keep the transferrer in its normal elevated position.

The protector-rockshaft of an ordinary form of protector-mechanism is shown partly at 60, and at 61 is the protector-finger upon such rockshaft which coöperates with the binder 7 of the shuttle-box at the replenishing side of the loom. Rockshaft 60 is carried by the lay-proper. While the said shuttle-box continues in its normal relations with respect to the lay-proper, as in Figs. 1, 4 and 6, the protector-finger 61 coacts with binder 7, in usual manner. When such shuttle-box is held back as in Figs. 3, 5 and 7, the said protector-finger and binder separate from each other temporarily but they resume normal coöperation as soon as the shuttle-box and the lay-proper resume normal relations. Ordinarily, the dwell of the shuttle-box and shuttle will be timed to begin after the forward movement of the lay has carried the dagger of the protector-mechanism forward past the engaging portion of the frog, in order that the loom may not unnecessarily bang-off in consequence of the dagger being permitted to drop when the said dwell separates the binder from the protector-finger. However, special devices may be employed to render the protector-mechanism temporarily inoperative in case it is desired to cause the dwell to begin at an earlier point in the advancing movement of the lay.

In the specific construction hereinbefore set forth the entire shuttle box is stopped in order to maintain the shuttle stationary while the transfer of a weft carrier into the shuttle is being effected. It is obvious that all that is essential is that so much of the shuttle box should be stopped as is necessary to insure the dwell of the shuttle; and that this result might be effected if the front wall of the shuttle box should be attached to the extension 13ª of the lay beam by simply providing stops on the shuttle box in front of the shuttle to prevent the forward movement of the shuttle by momentum. Hence, in the following claims, when they call for a dwell in the "shuttle box," reference is made only to so much of the shuttle box as must be stopped to insure the stoppage of the shuttle in its stationary transferring position.

I claim as my invention:—

1. A replenishing loom having means for effecting replenishment of weft or filling without arresting the loom, and in which normally the shuttle when at the replenishing side moves forward and rearward in unison with the lay, and having means whereby a dwell of the shuttle box at a distance from front center is produced to facilitate the transfer into the shuttle.

2. A replenishing loom having means for effecting replenishment of weft or filling without interruption of the weaving operations, and in which normally the shuttle when at the replenishing side moves forward and rearward in unison with the lay, and having means whereby a dwell of the shuttle box at a distance from front center is produced to facilitate transfer of weft or filling, and devices for effecting the transfer during the dwell.

3. A replenishing loom having means for effecting replenishment of weft or filling without arresting the loom, and in which normally the shuttle when at the replenishing side moves forward and rearward with the lay, and having means whereby a dwell in the forward movement of the shuttle box at a distance from front center is produced to facilitate the transfer into the shuttle.

4. A replenishing loom having means for producing a dwell of the shuttle-box at the replenishing side with the shuttle therein to facilitate transfer of weft or filling, while the lay moves relatively thereto, and means for effecting the transfer during the dwell.

5. A replenishing loom having means for effecting replenishment of weft or filling without arresting the loom by means of a transferrer mounted independently of the lay, and in which normally the shuttle when at the replenishing side moves forward and rearward in unison with the lay, and having means whereby a dwell of the shuttle box at a distance from front center in proper position for the transfer is maintained during the transfer 6. A replenishing loom having a weft-carrier guide mounted independently of the lay and in which normally the shuttle when at the replenishing side moves forward and rearward relative to the said guide, having means for transferring a reserve weft-carrier from the said guide into the shuttle, and also having means for producing a dwell of the shuttle box at a distance from front center in register with the said guide to facilitate thereby the transfer.

7. A replenishing loom having a weft-carrier guide mounted independently of the lay and in which normally the shuttle when at the replenishing side moves forward and rearward relative to the said guide, having a transferrer also mounted independently of the lay, and having means for producing a dwell of the shuttle box at a distance from front center in register with the said guide to facilitate thereby the transfer of a weft-carrier into the shuttle.

8. A replenishing loom in which replenishment is effected without arresting the loom, having means for coördinating the shuttle-box at the replenishing side of the loom with the lay normally, having transferring means, having a weft-carrier guide mounted independently of the lay, and also having means for producing a dwell of the shuttle-box at the replenishing side at a distance from front center with the shuttle therein in register with the said guide, to facilitate thereby transfer of weft or filling into the shuttle.

9. A replenishing loom in which replenishment is effected without arresting the loom, having means for coördinating the shuttle-box at the replenishing side of the loom with the lay normally, having a weft-carrier guide and a transferrer, both mounted independently of the lay, and also having means for producing a dwell of the shuttle-box at the replenishing side at a distance from front center with the shuttle therein in register with the said guide to facilitate thereby transfer of weft or filling into the shuttle.

10. A replenishing loom having a weft-carrier guide mounted independently of the lay, and in which normally the shuttle-box at the replenishing side accompanies the lay in the movements of the latter and in moving in unison with the lay carries the shuttle into and out of register with the said guide, and having means for producing a dwell of the said shuttle-box at a distance from front center with the shuttle therein in register with the said guide to facilitate thereby transfer of weft or filling into the shuttle.

11. A replenishing loom having a magazine containing spare weft carriers, a weft-carrier guide and a transferrer, both mounted independently of the lay, and in which normally the shuttle-box at the replenishing side accompanies the lay in the movements of the latter and in moving in unison with the lay carries the shuttle into and out of register with the said guide, and having means for producing a dwell of the said shuttle-box at a distance from front center in register with the said guide to facilitate thereby transfer of a weft carrier into the shuttle.

12. A replenishing loom having a magazine or feeder containing spare weft-carriers, a weft-carrier guide, and a transferrer, all mounted independently of the lay, and in which normally the shuttle-box at the replenishing side accompanies the lay in the movements of the latter and in moving in unison with the lay carries the shuttle into and out of register with the said guide, and having means for producing a dwell of the said shuttle-box at a distance from front center in register with the said guide to facilitate thereby transfer of a weft carrier into the shuttle.

13. A replenishing loom having means for effecting replenishment of weft or filling without arresting the loom, and having a cam in operative control of the movement of the shuttle forward and rearward when at the replenishing side, and through which for the purpose of replenishment or change a dwell of the shuttle box at a distance from front center is produced to facilitate the transfer into the shuttle, while the lay continues its usual movement.

14. A replenishing loom having means for effecting replenishment of weft or filling without interruption of the weaving operations, having a cam in operative control of the movement of the shuttle forward and rearward when at the replenishing side and whereby a dwell of the shuttle box at a distance from front center is produced at the time of replenishment or change to facilitate transfer of weft or filling into the shuttle, while the lay continues its usual movement.

15. A replenishing loom having means for effecting replenishment without interruption of the weaving operations having a cam in operative control of the shuttle-box at the replenishing side and through which a dwell of the shuttle box at a distance relative to front center is produced at the time of replenishment or change to facilitate the transfer of weft or filling into the shuttle, while the lay continues its usual movement.

16. A weft-replenishing loom having a transferring device mounted independently of the lay and the shuttle-box at the replenishing side, having a cam in operative control of the said shuttle-box, and means for rendering said cam effective to occasion a dwell of such shuttle-box with respect to the transferring device and to the continuing movement of the lay at the time of replenishment or change to facilitate transfer of weft or filling into the shuttle.

17. A weft-replenishing loom having a transferring device mounted independently of the lay and the shuttle-box at the replenishing side, with means for coördinating the said shuttle-box with the lay normally, and having means adapted to arrest the said shuttle-box in a position in which the shuttle contained therein registers properly with the transferring devices while the lay continues its usual movement, and a cam made effective for the purposes of the transfer to call the said means into action to effect such arrest at the time of replenishment or change to facilitate transfer of weft or filling into the shuttle.

18. A weft-replenishing loom having means for coördinating the shuttle-box at the replenishing side of the loom with the lay normally, and having a detent adapted to arrest the said shuttle-box with the shuttle contained therein in register with the transferring or change devices to facilitate the transfer of weft or filling into the shuttle, while the lay continues in its usual movement, and a normally-inoperative cam that is made effective for the purposes of the transfer to call such detent into action to effect such arrest.

19. A weft-replenishing loom having means for coördinating the shuttle-box at the replenishing side of the loom with the lay normally, and having a detent adapted to arrest the said shuttle-box with the shuttle contained therein in register with the transferring or change devices to facilitate the transfer of weft or filling into the shuttle, while the lay continues in its usual movements, and a normally-inoperative cam that is made effective for the purposes of the transfer to call such detent into action to effect such arrest, and also call the transferrer into action to effect such transfer.

20. A replenishing loom having means for effecting replenishment of weft or filling without interruption of the weaving operations, having a cam in operative control of the transferrer and of the movement of the shuttle forward and rearward when at the replenishing side and whereby a dwell of the shuttle box at a distance from front center is produced at the time of replenishment or change while the transfer of weft or filling into the shuttle takes place, and while the lay continues its usual movement.

21. A replenishing loom having a cam, means adapted to be controlled by the said cam to produce a dwell of the shuttle box at a distance from front center at the time of replenishment or change, to facilitate the latter, and devices for causing a shift of the said cam transversely relative to the member of the said means with which it coacts, to thereby call such means into action to produce the dwell.

22. A replenishing loom having detent means adapted to detain the shuttle-box at the replenishing side of the loom in register with transferring or change devices to facilitate the transfer or change, a normally inoperative cam, and devices for causing a shift of the said cam transversely relative to the member of the said detent means with which it coacts, into operative relations therewith, to thereby call such means into action to produce the detention of the shuttle-box while the transfer or change takes place.

23. A replenishing loom having a detent adapted to detain the shuttle-box at the replenishing side of the loom in position for the transfer or change, a normally inoperative rotating cam, a lever operatively controlling the transfer and the said detent, and devices for causing a shift of the said cam transversely relative to the said lever to thereby call the detent and transferrer into action for the purposes of the transfer or change.

24. A replenishing loom having a detent adapted to detain the shuttle-box at the replenishing side of the loom in position for the transfer or change, a normally inoperative rotating cam, a lever operatively combined with the detent and the transferrer, and devices for causing a shift of the said cam transversely into operative relations to the said lever to actuate the latter and thereby call the detent into action and actuate the transferrer.

25. A replenishing loom having a shuttle-box movable with and also relatively to the lay and normally held by spring-tension in working relation with the path of the shuttle across the lay, a detent adapted to detain such shuttle-box at the rear of front center in position relative to the transferring devices to facilitate a transfer or change, and devices for calling the said detent and the transferrer into action to accomplish the transfer or change while the lay is forward with relation to the shuttle-box.

26. A replenishing loom having a shuttle-box movable with and also relative to the lay, means for holding said shuttle-box normally in working relation with the path of the shuttle across the lay comprising a spring-actuated rocker mounted in connection with the shuttle-box and having connection with the lay proper, a detent adapted to detain the shuttle-box as the lay goes forward in position relative to the transferring devices to facilitate a transfer or change, and devices for calling the detent and the transferrer into action to accomplish the transfer or change while the lay is forward with relation to the shuttle-box.

27. A replenishing loom having transferring devices mounted independently of the lay, and a shuttle-box movable with and also relative to the lay, means for holding the said shuttle-box and the shuttle occupying the same in a definite presentation to the transferring devices while the lay continues its movement, to facilitate the transfer into the shuttle, and a normally-retracted weft-carrier chute in connection with the shuttle-box caused to assume working position during the said continuation of the lay-movement.

28. A replenishing loom having transferring devices mounted independently of the lay, and a shuttle-box movable with and also relative to the lay, means for holding the said shuttle-box and the shuttle occupying the same in a definite presentation to the transferring devices while the lay continues its movement, to facilitate the transfer into the shuttle, and a normally-retracted weft-carrier chute in connection with the shuttle-box caused to assume working position by the said continuation of the lay-movement.

29. A replenishing loom having transferring devices mounted independently of the lay, and a shuttle-box movable with and also relative to the lay, means for holding the said shuttle-box and the shuttle occupying the same in a definite presentation to the transferring devices while the lay continues its movement, to facilitate the transfer into the shuttle, a weft-carrier chute, normally spring-held in retracted position, and means intermediate the lay and the chute whereby as a result of the said continuation of the lay-movement the chute is placed in working position.

30. A replenishing loom having a shuttle-box movable with and also relatively to the lay and normally held in working relation with the path of the shuttle across the lay, means to detain such shuttle-box at the rear of front center in position relative to the transferring devices to facilitate a transfer or change, devices for effecting the transfer while the lay is moving independently of the shuttle-box, a normally-retracted weft-carrier chute mounted in connection with the shuttle-box, and means operated by the moving lay to place the chute in working position at the time of transfer.

31. A replenishing loom having a shuttle-box movable with and also relative to the lay, means for holding said shuttle-box normally in working relations with the path of the shuttle across the lay comprising a spring-actuated rocker mounted in connection with the shuttle-box and having connection with the lay proper, means to detain the shuttle-box as the lay goes forward in position relative to the transferring devices to facilitate a transfer or change, and a normally-retracted weft-carrier chute mounted in connection with the shuttle-box and actuated by said rocker to place it in working position for the purposes of the transfer or change.

32. A replenishing loom having devices for producing a pause in the movements of the shuttle box at a distance from front center, and means for effecting replenishment during the pause, without interruption in the regular movements of the lay.

33. A weft replenishing loom having, in combination, a lay which continues its regular movements during the replenishing action; a shuttle box yieldingly connected with the lay at the replenishing side of the loom; means controlled in its action by the condition of the running weft which stops the forward movement of said shuttle box after the shuttle has arrived therein and before the lay reaches front center; and weft replenishing mechanism which replenishes the weft while the shuttle box is stationary.

34. A weft replenishing loom having, in combination, a lay which continues its regular movements during the replenishing action; a shuttle box normally moving with the lay at the replenishing side of the loom; means controlled in its action by the condition of the running weft which stops the forward movement of said shuttle box after the shuttle has arrived therein and before the lay reaches front center; and weft replenishing mechanism which replenishes the weft while the shuttle box is stationary.

In testimony whereof I affix my signature in presence of two witnesses.

EUGENE H. BALLOU.

Witnesses:
 IVAN A. BLAKE,
 ELSIE A. BARTZSCH.